Jan. 25, 1972 TERUHIKO OJIMA ET AL 3,637,605

OXIDE MAGNETS

Filed Sept. 4, 1969 6 Sheets-Sheet 1

United States Patent Office 3,637,605

Patented Jan. 25, 1972

3,637,605

OXIDE MAGNETS

Teruhiko Ojima and Gosaburo Nishi, Nagareyama-shi, Japan, assignors to TDK Electronics Company Ltd., Tokyo, Japan Filed Sept. 4, 1969, Ser. No. 855,221
Claims priority, application Japan, Sept. 16, 1968, 43/66,081
Int. Cl. H01f *1/00*
U.S. Cl. 252—62.59 1 Claim

ABSTRACT OF THE DISCLOSURE

An oxide magnet consisting primarily of BaO and $Fe_2O_3$, the molar ratio of BaO to $Fe_2O_3$ being between 1:5 and 1:6, and containing in addition 0.05 to 0.3% by weight CaO and 0.4 to 0.65% by weight of $SiO_2$, has large coercive force and high magnetic energy.

This invention relates to improvements in oxide magnet materials, particularly to improvements in oxide magnet materials having magnetoplumbite crystal structure composed of $Mo.6Fe_2O_3$ where M is a metal selected from the group consisting of Ba, Sr and Pb.

It is well-known that the oxide magnet composed of BaO6FeO has good magnetic properties, that is, its coercive force $_BH_c$ is large and its magnetic energy $(BH)_{max}$ is higher than that of the cobalt ferrite magnet. The magnetic remanence Br of $BaO6Fe_2O_3$ is however, not satisfactorily large, and though various improvements were proposed, this defect has not been overcome.

It is, therefore, the object of this invention to improve the magnetic properties of the binary system comprising MO and $Fe_2O_3$. More fully speaking, the object of this invention is to improve Br, $_BH_c$ and $(BH)_{max}$ of the magnet of above-mentioned binary system, where the molar ratio of $Fe_2O_3$ to MO is between 5 to 6, by adding small quantities of CaO and $SiO_2$.

This invention may be more readily understood by reference to the following detailed description and to the accompanying drawings, in which.

Briefly stated, according to the present invention, an novel composition of oxide magnet materials with specific compositional ratios is obtained, so that the magnetic properties of the magnet are considerably improved. The method of producing it, however, is not substantially different from that of the prior art, and as such it does not constitute part of the invention.

The following is an example of the magnet of the invention:

A mixture of metallic oxides in the molar proportions 5.3 $Fe_2O_3$ and 1.0 BaO is intimately mixed, presintered and crushed, and then the crushed mixture of materials is combined with about 0.1% by weight of CaO and about 0.4 to about 0.8% by weight of $SiO_2$, and sintered at about 1200° C. The resulting sintered oxides have the following magnetic properties:

| $SiO_2$/CaO | 0 | 0.4/0.1 | 0.5/0.1 | 0.6/0.1 | 0.7/0.1 | 0.8/0.1 |
|---|---|---|---|---|---|---|
| Br (gauss) | 1,890 | 2,240 | 2,340 | 2,260 | 2,180 | 2,100 |
| $H_c$ (oe.) | 1,840 | 2,030 | 2,140 | 2,180 | 2,100 | 2,020 |
| $(BH)_{max}$ | 0.87 | 1.12 | 1.25 | 1.23 | 1.14 | 1.06 |

Figure 1:
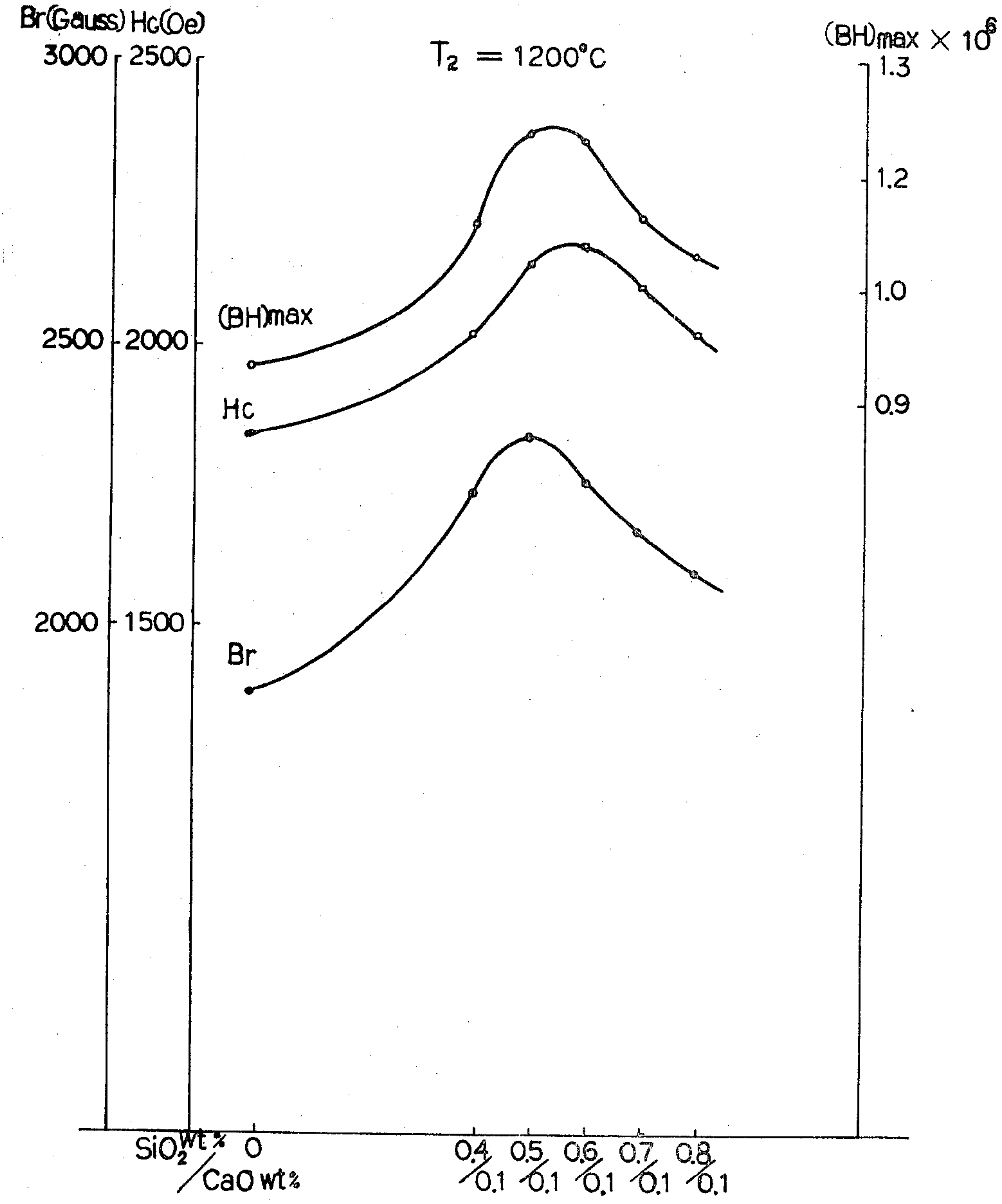
FIGS. 1 and 4 show curves indicating magnetic properties of oxide magnets of this invention.

FIG. 1 gives the curves illustrating the abovementioned characteristics.

For purpose of comparison, either CaO or $SiO_2$ alone is added to the BaO mixture of $(Fe_2O_3)=5.3$. These mixtures were also sintered at 1200° C. In these cases, the variation of the properties of magnets as a function of the proportion of CaO or $SiO_2$ is as follows:

| CaO (wt. percent) | 0 | 0.05 | 0.1 | 0.2 | 0.35 | 1.0 |
|---|---|---|---|---|---|---|
| Br (gauss) | 1,890 | 1,920 | 2,040 | 2,040 | 2,020 | 2,000 |
| $H_c$ (Oe.) | 1,840 | 1,890 | 1,970 | 1,990 | 1,970 | 1,800 |
| $(BH)_{max}$ | 0.87 | 0.91 | 1.00 | 1.01 | 0.99 | 0.9 |

| $SiO_2$ (wt. percent) | 0 | 0.2 | 0.4 | 0.7 | 1.0 | 2.0 |
|---|---|---|---|---|---|---|
| Br (gauss) | 1,890 | 2,180 | 2,170 | 2,130 | 2,140 | 2,060 |
| $H_c$ (oe.) | 1,840 | 2,120 | 2,130 | 2,100 | 2,040 | 2,010 |
| $(BH)_{max}$ | 0.87 | 1.15 | 1.15 | 1.12 | 1.09 | 1.04 |
| CaO (wt. percent) | 0 | 0.05 | 0.1 | 0.2 | 0.35 | 1.0 |

Figure 2:
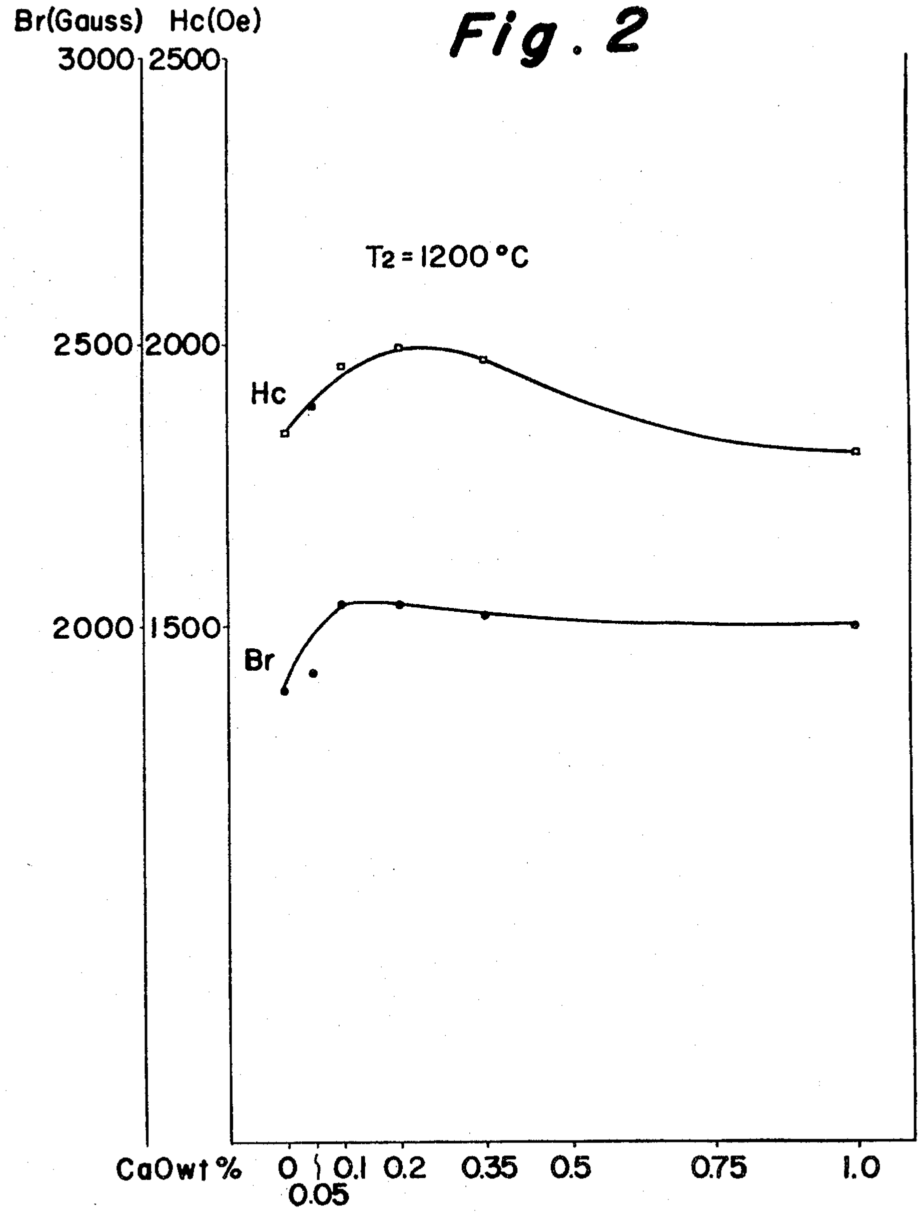
FIG. 2 shows curves of magnetic properties of oxide magnets wherein CaO only has been added.
Figure 3:
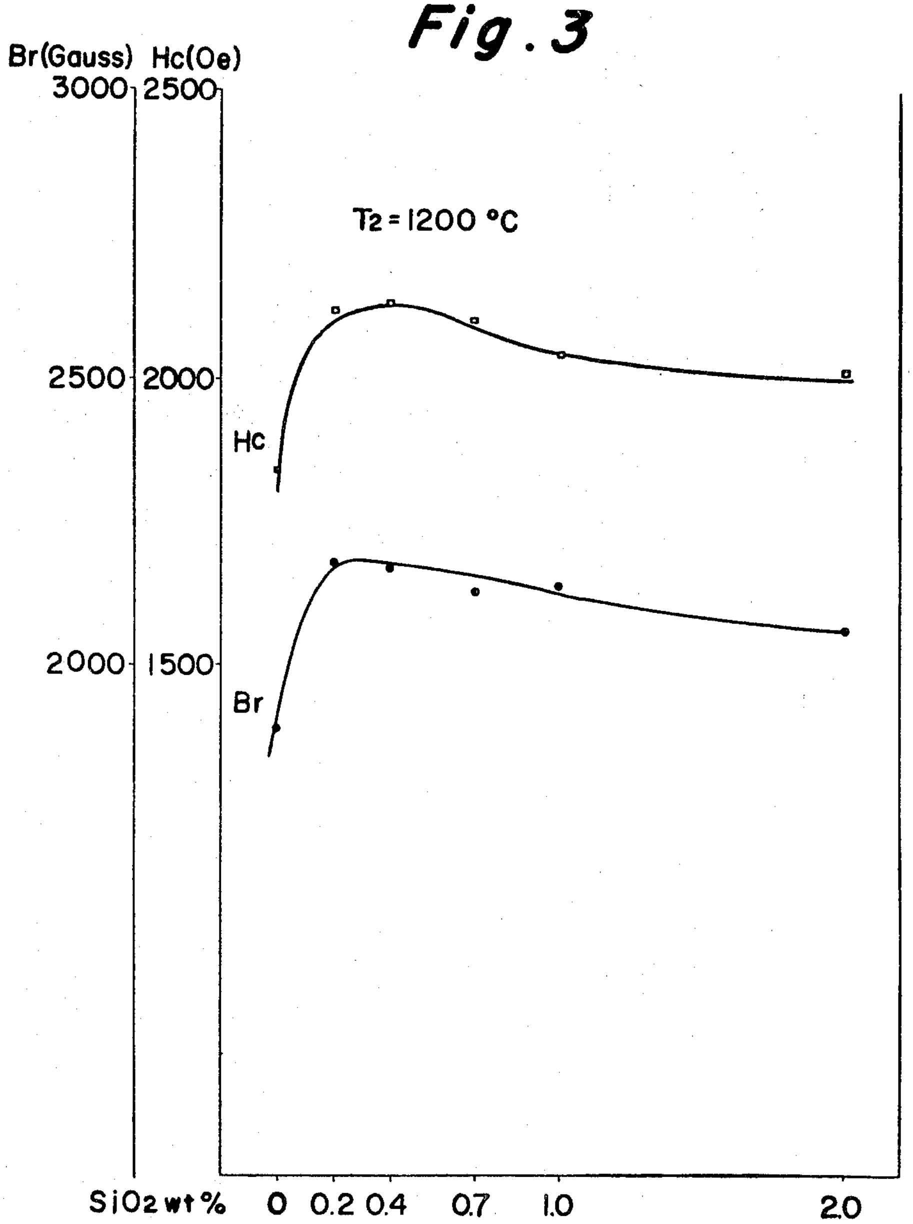
FIG. 3 shows curves of magnetic properties of oxide magnets in which $SiO_2$ only has been added.

FIGS. 2 and 3 show the curves illustrating the abovementioned characteristics.

It is clear from the above comparative tables that the magnetic properties of the material $(BaO.nFe_2O_3)$ mixed together with both CaO and $SiO_2$ are far better than those of the material mixed with only one of either CaO or $SiO_2$.

The variation of the magnetic properties of the material as a function of the proportions of CaO and $SiO_2$ may be given as follows (wherein the fundamental composition is $BaO.(Fe_2O_3)5.3$):

| $SiO_2$/CaO (molar ratio) | 0.2/0.5 | 0.35/0.35 | 0.5/0.2 | 0.6/0.1 | 0.65/0.05 | 0.7/0 |
|---|---|---|---|---|---|---|
| Br (gauss) | 2,020 | 2,200 | 2,280 | 2,260 | 2,230 | 2,130 |
| $H_c$ (oe.) | 1,950 | 2,040 | 2,180 | 2,160 | 2,110 | 2,100 |
| $(BH)_{max}$ | 0.98 | 1.12 | 1.25 | 1.23 | 1.17 | 1.12 |

Figure 4:
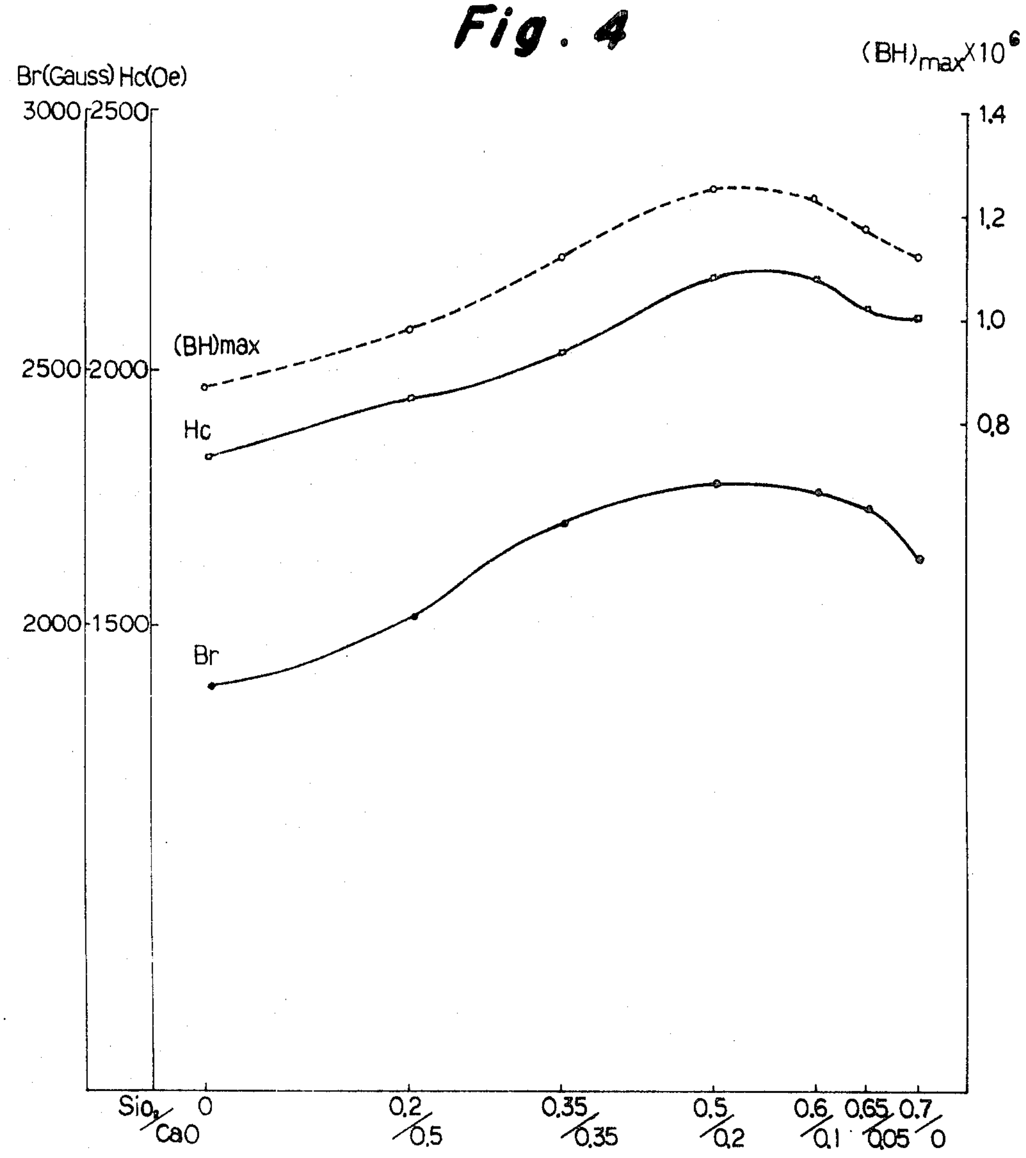

FIG. 4 shows the curves illustrating the abovementioned characteristics.

As shown in FIGS. 1 and 4, although the Br, $H_c$ and $(BH)_{max}$ of $BaO(Fe_2O_3)5.3$ are 1890 (gauss), 1840 (oe.) and $0.87\times10^6$, respectively, these properties are improved by more than 10% if both CaO and $SiO_2$ are added to said oxide magnet material. And moreover, experimental tests clearly teach that the density of the oxide magnet increases by more than 10% by addition of these two oxides.

The magnetic properties of the oxide magnet $$BaO(Fe_2O_3)n$$

where $n$ is between 5.0 and 6.0, containing 0.6 weight percent of $SiO_2$ and 0.1 weight percent of CaO are as follows:

| Ratio of $Fe_2O_3$ to BaO | 5.0 | 5.3 | 5.6 | 6.0 |
|---|---|---|---|---|
| (a) Nothing being added: | | | | |
| Br | 1,910 | 1,890 | 1,710 | 1,520 |
| Hc | 1,940 | 1,840 | 1,750 | 1,500 |
| $(BH)_{max}$ | 0.89 | 0.87 | 0.75 | 0.57 |
| (b) 0.6 wt. percent of $SiO_2$ and 0.1 wt. percent of CaO being added: | | | | |
| Br | 2,140 | 2,260 | 2,220 | 1,980 |
| Hc | 2,200 | 2,180 | 2,170 | 2,080 |
| $(BH)_{max}$ | 1.17 | 1.23 | 1.16 | 1.02 |

Figure 5:
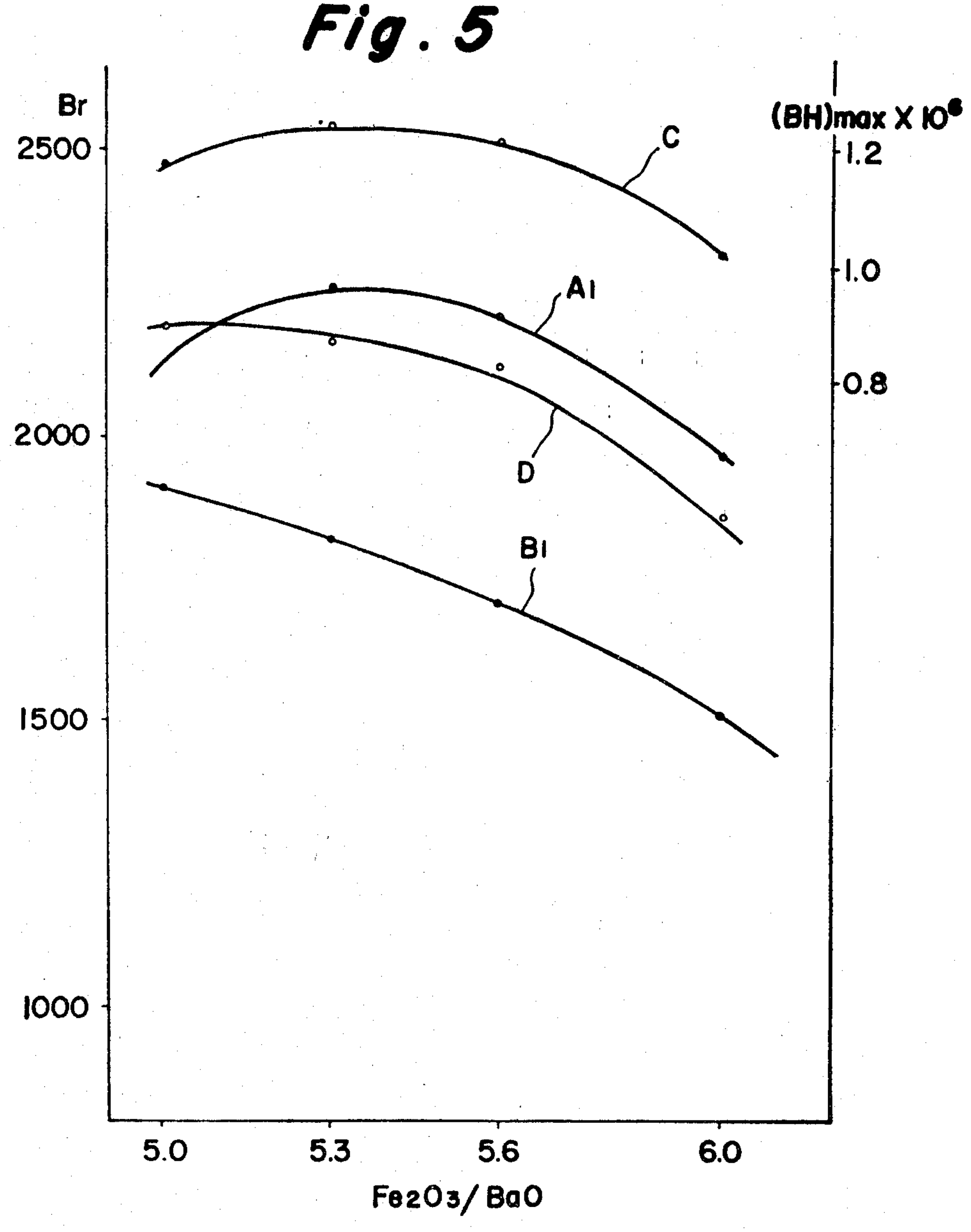
FIG. 5 shows curves of $(BH)_{max}$ of oxide magnets $BaO.nFe_2O_3$, where $n$ is between 5 and 6, containing in addition both $SiO_2$ and CaO.

The curve $A_1$ of FIG. 5 shows the Br of the material containing 0.6% by weight of $SiO_2$ and 0.1% by weight of CaO, while the curve B1 shows the Br of the material containing neither $SiO_2$ nor CaO.

Figure 6:
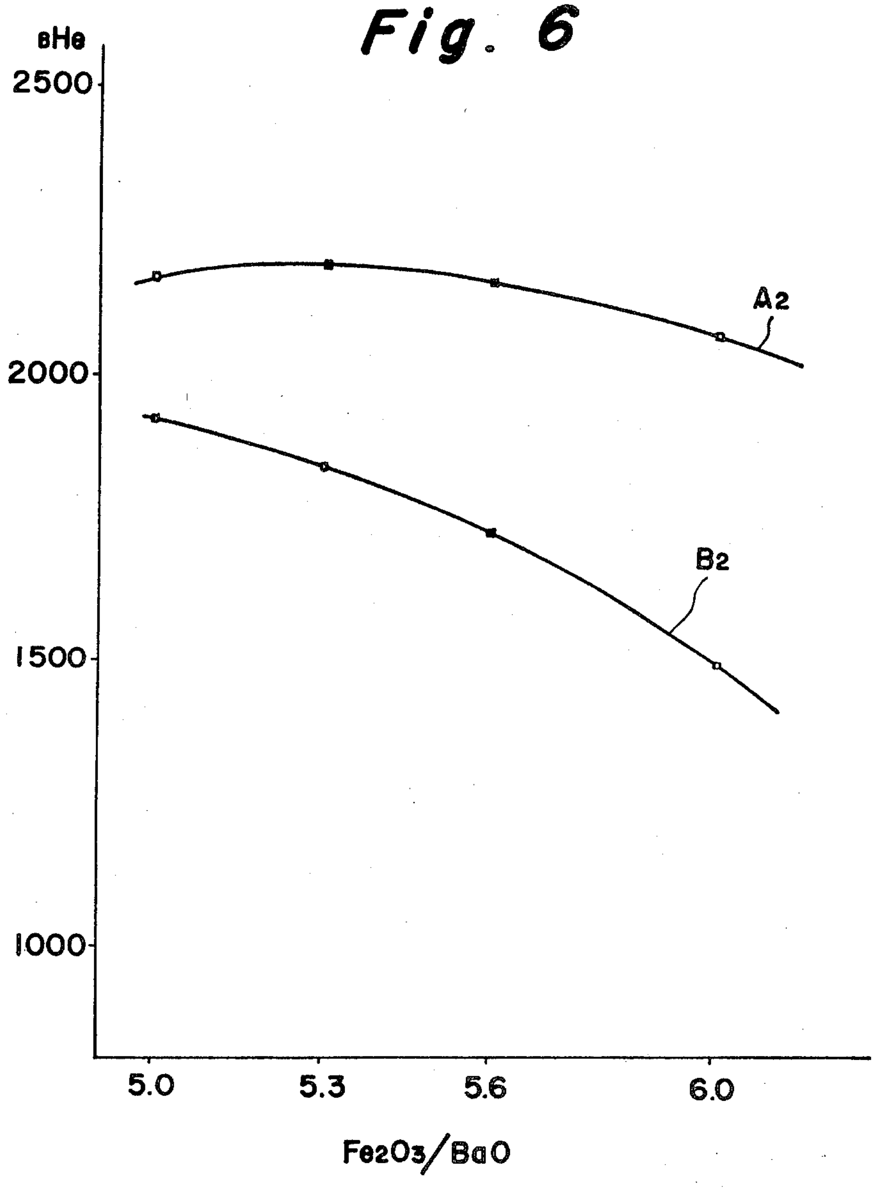
FIG. 6 shows curves of $H_c$ of the same magnets given in FIG. 5.

In FIG. 6, the curves $A_2$ and $B_2$ show the $H_c$ of the materials containing both, and containing neither, respectively, $SiO_2$ and CaO.

Curves C and D of FIG. 5 show the magnetic energy $(BH)_{max}$ of the materials with the same above-mentioned compositions.

It is clear from FIGS. 5 and 6 that the addition of CaO and $SiO_2$ is very effetcive for the improvement of the magnetic properties of the oxide material $$BaO(Fe_2O_3)n$$

As it can be readily understood from the foregoing description, the magnetic properties of the oxide magnet composed of $Fe_2O_3$ and BaO, the ratio of $Fe_2O_3$ to BaO being between 5.0 and 6.0, are much improved by the addition of 0.05 to 0.3% by weight of CaO and 0.4 to 0.65% by weight of $SiO_2$, the result being a magnet having a large coercive force and a high magnetic remanence.

The proportions of the oxides, when limited to the above-mentioned ranges give the maximum values of Br, $H_c$ and $(BH)_{max}$ within said range.

What we claim as new and wish to secure by Letters Patent of the United States is:

1. A barium ferrite magnet in which BaO and $Fe_2O_3$ are in a molar ratio of BaO to $Fe_2O_3$ of between 1:5 and 1:6 and wherein there are present from about 0.05 to about 0.3% by weight of CaO and from about 0.4 to about 0.65% by weight of $SiO_2$.

References Cited

UNITED STATES PATENTS

| | | | |
|---|---|---|---|
| 2,980,617 | 4/1961 | Ireland | 252—62.63 X |
| 3,155,623 | 11/1964 | Erickson et al. | 252—62.63 X |

FOREIGN PATENTS

| | | | |
|---|---|---|---|
| 883,047 | 11/1961 | Great Britain | 252—62.63 |
| 988,835 | 4/1965 | Great Britain | 252—62.63 |

TOBIAS E. LEVOW, Primary Examiner

J. COOPER, Assistant Examiner

U.S. Cl. X.R.

252—62.63